US008433056B2

(12) United States Patent
De Lind Van Wijngaarden et al.

(10) Patent No.: US 8,433,056 B2
(45) Date of Patent: Apr. 30, 2013

(54) VALIDATED SIGNAL RESUMPTION IN DSL SYSTEMS

(75) Inventors: Adriaan J. De Lind Van Wijngaarden, New Providence, NJ (US); Carl Jeremy Nuzman, Union, NJ (US); Jochen Maes, Veerle (BE); Danny Van Bruyssel, Temse (BE)

(73) Assignee: Alcatel Lucent, Paris (FR)

( * ) Notice: Subject to any disclaimer, the term of this patent is extended or adjusted under 35 U.S.C. 154(b) by 1033 days.

(21) Appl. No.: 12/387,339

(22) Filed: May 2, 2009

(65) Prior Publication Data
US 2010/0278222 A1 Nov. 4, 2010

(51) Int. Cl.
*H04M 1/00* (2006.01)
*H04M 3/22* (2006.01)
*H04M 11/00* (2006.01)
*H04B 1/38* (2006.01)
*H04L 12/50* (2006.01)

(52) U.S. Cl.
USPC ............... 379/377; 379/32.04; 379/93.01; 375/222; 370/359

(58) Field of Classification Search ........... 379/9.06, 379/32.04, 93.01, 93.07, 93.36, 108.02, 377, 379/379, 383; 375/222, 288; 370/359
See application file for complete search history.

(56) References Cited

U.S. PATENT DOCUMENTS

| | | | | |
|---|---|---|---|---|
| 4,780,883 A | * | 10/1988 | O'Connor et al. | 375/219 |
| 4,862,456 A | * | 8/1989 | Giorgio | 370/276 |
| 5,005,168 A | * | 4/1991 | Cummiskey et al. | 370/276 |
| 5,799,064 A | * | 8/1998 | Sridhar et al. | 379/93.06 |
| 5,943,364 A | * | 8/1999 | Yoshida | 375/222 |
| 6,067,318 A | * | 5/2000 | Bailey et al. | 375/222 |
| 6,487,241 B1 | * | 11/2002 | Cole | 375/220 |
| 6,999,506 B2 | * | 2/2006 | Palm | 375/222 |
| 7,164,764 B2 | | 1/2007 | Zimmerman et al. | |
| 7,411,998 B1 | * | 8/2008 | Cole | 375/222 |
| 7,688,884 B2 | * | 3/2010 | Cioffi et al. | 375/222 |
| 7,830,978 B2 | | 11/2010 | Guenach et al. | |
| 7,843,990 B2 | | 11/2010 | Kramer et al. | |
| 7,991,122 B2 | | 8/2011 | Cioffi et al. | |
| 8,009,665 B2 | | 8/2011 | Cioffi et al. | |
| 8,081,560 B2 | | 12/2011 | De Lind Van Wijngaarden et al. | |

(Continued)

OTHER PUBLICATIONS

George Ginis, "Low-Power modes for ADSL2 and ADSL2+", SPAA021, Broadband Communications Group, Texas Instrument, White Paper, Jan. 2005, 14 pages.

(Continued)

*Primary Examiner* — Christopher M Brandt
(74) *Attorney, Agent, or Firm* — John F. M$^c$Cabe

(57) ABSTRACT

An apparatus includes a DSL transceiver configured to transit to a DSL wait state in which a power transmitted from the DSL transceiver to a local-end line is substantially reduced in response to an interruption or substantial stop at the DSL transceiver of reception of DSL communications from the local-end line. The DSL transceiver is configured to transmit to the local-end line a DSL acknowledge signal in response to receiving from the local-end line a DSL wait signal. The DSL transceiver is configured to resume to transmit DSL communications to the local-end line at a power substantially higher than the power transmitted thereto in the DSL wait state in response either to receiving from the local-end line DSL transmissions at a substantially higher power than received there from in the DSL wait state or to receiving from the local-end line a second DSL acknowledge signal.

20 Claims, 6 Drawing Sheets

U.S. PATENT DOCUMENTS

| | | | |
|---|---|---|---|
| 2003/0108063 A1 | 6/2003 | Joseph et al. | |
| 2003/0123486 A1* | 7/2003 | Lacey, III | 370/485 |
| 2004/0090927 A1 | 5/2004 | Zimmerman et al. | |
| 2006/0274825 A1* | 12/2006 | Cioffi et al. | 375/222 |
| 2006/0274893 A1 | 12/2006 | Cioffi et al. | |
| 2007/0165533 A1 | 7/2007 | Wu | |
| 2008/0181287 A1* | 7/2008 | Rofougaran | 375/222 |
| 2008/0184052 A1* | 7/2008 | Itoh et al. | 713/324 |
| 2008/0247446 A1 | 10/2008 | Kramer et al. | |
| 2008/0298444 A1 | 12/2008 | Cioffi et al. | |
| 2009/0059780 A1 | 3/2009 | De Lind Van Wijngaarden et al. | |
| 2009/0060013 A1* | 3/2009 | Ashikhmin et al. | 375/222 |
| 2009/0060067 A1 | 3/2009 | Guenach et al. | |
| 2009/0073868 A1* | 3/2009 | Guenach et al. | 370/201 |
| 2009/0116582 A1* | 5/2009 | Ashikhmin et al. | 375/296 |
| 2009/0175156 A1 | 7/2009 | Xu | |
| 2009/0207985 A1 | 8/2009 | Cioffi et al. | |
| 2009/0245081 A1 | 10/2009 | Ashikhmin et al. | |
| 2009/0304056 A1* | 12/2009 | De Lind Van Wijngaarden et al. | 375/222 |
| 2010/0202281 A1 | 8/2010 | Kramer | |
| 2011/0200080 A1 | 8/2011 | Fang | |

OTHER PUBLICATIONS

Danny Van Bruyssel, et al., "G.vdsl: Impact of a disorderly leaving event on a precoded VDSL2 system", International Telecommunication Union, Telecommunication Standardization Sector, Study Group 15—Contribution 542, May 2007, 7 pages.

ITU-T, Telecommunication Standardization Sector of ITU, G.993.2, Series G: Transmission Systems and Media, Digital Systems and Networks, Digital sections and digital line system—Access networks, "Very high speed digital subscriber line transceivers 2 (VDSL2)", (Feb. 2006) 252 pgs.

PCT International Search Report, PCT/US2010/032868, International Filing Date Apr. 29, 2010, Date of Mailing Dec. 16, 2010, 5 pages.

PCT International Search Report, PCT/US2009/003241, International Filing Date May 28, 2009, Date of Mailing Dec. 30, 2009, 3 pages.

* cited by examiner

VALIDATED SIGNAL RESUMPTION IN DSL SYSTEMS

BACKGROUND

1. Technical Field

The inventions relate to apparatus for DSL communications and methods of operating such apparatus.

2. Discussion of the Related Art

This section introduces aspects that may be helpful to facilitating a better understanding of the inventions. Accordingly, the statements of this section are to be read in this light and are not to be understood as admissions about what is in the prior art or what is not in the prior art.

Many digital subscriber loop (DSL) communication systems are susceptible to downlink and/or uplink crosstalk between the links connecting pairs of DSL transceivers that communicate over the links. The crosstalk is typically caused by physical effects such as inductive coupling between the twisted wire pairs of common local-end lines of the telephone company. Such crosstalk can negatively affect communications by reducing distances over which DSL data communications can be maintained and/or by reducing maximum DSL data communication rates.

Some multi-channel data communication systems compensate for undesired effects of crosstalk in downlink and uplink communications. To perform such compensation, the multi-channel data communication systems typically measure downlink and uplink channel matrices, i.e., $H_D$ and $H_U$, respectively, for the shared communications channel. From the form of the downlink channel matrix, $H_D$, a central transmitter may precode downlink multi-channel data communications so that far-end transceivers receive data signals that are substantially free of crosstalk-related distortions. From the uplink channel matrix, $H_U$, a central receiver may decode received uplink multi-channel data communications to produce separated data signal streams that are substantially free of crosstalk-related distortions.

The measurement of the downlink and uplink channel matrices $H_D$ and $H_U$ may be performed during initialization and/or tracking of the parallel multi-channel data communication sessions over the multi-channel communication system. In addition, different pairs of channel matrices $H_D$ and $H_U$ may be measured for different frequency channels or disjoint sets of frequency channels, e.g., different DSL tones or disjoint sets of nearby DSL tones. The measured forms of the downlink and uplink channel matrices $H_D$ and $H_U$ may be updated as data communication sessions are added to or removed from the set of parallel DSL communication that share the communications channel. The compensation of a set of simultaneous communication sessions on different channels to reduce undesired effects of crosstalk there between is referred to as vectoring. Such vectoring may be done to reduce crosstalk between the DSL data communication sessions carried by a group of local-end lines that suffer from inter-line inductive coupling. Such of a group of DSL communications sessions that undergo DSL vectoring will be referred to as a DSL vectoring group.

BRIEF SUMMARY

Various embodiments provide apparatus and methods that may be used in DSL communication systems to support DSL vectoring. In response to an unexpected interruption or substantial stop of an active DSL data communication session between a first DSL transceiver pair, the embodiments reduce power levels transmitted to the local-end line for the first DSL transceiver pair to reduce the crosstalk that the unexpected interruption or substantial stop induces on the links between other DSL transceiver pairs of the DSL vectoring group. The methods and apparatus are configured to resume ordinary DSL data transmissions between the first DSL transceiver pair by validating that the first DSL transceiver pair and local-end line thereof are again able to support bi-directional DSL communications.

A first method includes transiting a first DSL transceiver from a DSL communication session to a DSL wait state in which the first DSL transceiver transmits a substantially lower power to a local-end line. The transiting is responsive to an interruption or a substantial stop in the DSL communication session of DSL communications in one direction between the first DSL transceiver and a second DSL transceiver. The first method includes transmitting a first DSL acknowledge signal from the first DSL transceiver to the local-end line in response to receiving a DSL wait signal at the first DSL transceiver from the local-end line. The first method includes, in response to the act of transmitting, resuming to transmit DSL communications from the first DSL transceiver to the local-end line at a power substantially higher than a power transmitted to the local-end line in the DSL wait state. The act of resuming is responsive to the transmitting and to either to receiving at the first DSL transceiver a substantially higher DSL power than a DSL power received there in the DSL wait state or to receiving at the first DSL transceiver a second DSL acknowledge signal from the second DSL transceiver.

In some embodiments of the first method, the act of transiting includes transmitting a DSL wait signal from the first DSL transceiver to the local-end line.

In some embodiments, the first method includes receiving a DSL acknowledge signal from the second DSL transceiver at the first DSL transceiver.

In some embodiments of the first method, the interruption or substantial stop includes receiving from the local-end line at the first transceiver a time-averaged DSL power that is reduced by 6 dB or more relative to a time-averaged DSL power received from the local-end line at the first transceiver during an active state immediately prior to the interruption or substantial stop.

In some embodiments of the first method, the time-averaged DSL power transmitted by the first transceiver to the local-end line between the act of transiting and the act of resuming is reduced by 6 dB or more with respect to a time-averaged DSL power transmitted to the local-end line by the first transceiver during a DSL active state just prior to the DSL wait state.

In some embodiments of the first method, the act of resuming to transmit DSL communications includes preceding data transmissions of a set of centrally controlled DSL transceivers including the first DSL transceiver. The preceding uses a preceding matrix used to precode DSL data signals for transmission by the set just prior to the time of the interruption or substantial stop.

In some embodiments of the first method, the first DSL transceiver transmits DSL power to the local-end line between the act of transiting and the act of resuming over less than a third of a set of DSL tones used by the first DSL transceiver to transmit DSL communications thereto during a DSL active state just prior to the DSL wait state.

In some embodiments of the first method, the act of resuming includes decoding DSL data communications received by a set of centrally controlled DSL transceivers including the first DSL transceiver. The decoding uses a decoding matrix used to decode DSL data signals received by the set just prior to a time of the interruption or substantial stop.

A second method includes transiting a first DSL transceiver to a DSL wait state in which the first DSL transceiver transmits a substantially lower power to a local-end line in response to an interruption or a substantial stop of DSL communications in one direction between the first DSL transceiver and a second DSL transceiver. The first DSL transceiver transmits a DSL wait signal to the local-end line in the DSL wait state. The method includes resuming to transmit DSL communications from the first DSL transceiver to the local-end line at a power substantially higher than a power transmitted from the first DSL transceiver to the local-end line in the DSL wait state or transmitting a second DSL acknowledge signal from the first DSL transceiver to the local-end line. The act of resuming to transmit DSL communications or transmitting a second DSL acknowledge signal is responsive to receiving at the first DSL transceiver a first DSL acknowledge signal from the local-end line in response to the DSL wait signal.

In some embodiments of the second method, in response to the receiving at the first DSL transceiver a first DSL acknowledge signal, the first DSL transceiver transmits a second DSL acknowledge signal to the local-end line.

In some embodiments of the second method, the act of transiting includes reducing a time-averaged DSL power transmitted from the first DSL transceiver to the local-end line by 6 dB or more relative to a time-averaged DSL power transmitted thereto by the first DSL transceiver during the DSL communication session in which DSL communications were interrupted or substantially stopped.

In some embodiments of the second method, the first DSL transceiver transmits the DSL wait signal to the local-end line over less than a third of DSL tones used by the first DSL transceiver to transmit DSL data communications during the DSL communication session in which DSL communications were interrupted or substantially stopped.

A first apparatus includes a DSL transceiver configured to transit to a DSL wait state in which a power transmitted from the DSL transceiver to a local-end line is substantially reduced in response to an interruption or substantial stop at the DSL transceiver of reception of DSL communications from the local-end line. The DSL transceiver is configured to transmit to the local-end line a DSL acknowledge signal in response to receiving from the local-end line a DSL wait signal. The DSL transceiver is configured to perform an act of resuming to transmit DSL communications to the local-end line at a power substantially higher than the power transmitted thereto in the DSL wait state in response either to receiving from the local-end line DSL transmissions at a substantially higher power than received there from in the DSL wait state or to receiving from the local-end line a second DSL acknowledge signal.

In some embodiments, the first apparatus may include a set of centrally controlled DSL transceivers including the DSL transceiver configured to perform the act of resuming. The set of the centrally controlled DSL transceivers is configured to precode parallel DSL data transmissions with a matrix when the DSL transceiver performs the act of resuming. The matrix is used to precode parallel data transmissions near and prior to the interruption or substantial stop.

In some embodiments, the first apparatus may include a set of centrally controlled DSL transceivers including the DSL transceiver configured to perform the act of resuming. The set of the centrally controlled DSL transceivers is configured to decode parallel received DSL data communications with a matrix when the DSL transceiver performs the act of resuming. The matrix is used to decode received DSL data communications near and prior to the interruption or substantial stop.

In the above embodiments of the first apparatus, the DSL transceiver configured to transit to the wait state may also be configured to transmit to the local-end line a DSL wait signal during the DSL wait state.

A second apparatus includes a DSL transceiver. The DSL transceiver is configured to transit to a DSL wait state in response to an interruption or substantial stop at the DSL transceiver of reception of DSL communications from the local-end line. In the wait state, a power transmitted from the DSL transceiver to a local-end line is substantially reduced. The DSL transceiver is configured to transmit a DSL wait signal to the local-end line in the DSL wait state. The DSL transceiver is configured to perform an act of resuming to transmit DSL communications to the local-end line at a power substantially higher than the power transmitted by the DSL transceiver thereto in the DSL wait state in response to receiving a DSL acknowledge signal from the local-end line responsive to transmitting the wait signal thereto.

In some embodiments of the second apparatus, the DSL transceiver may be configured to transit to the wait state by reducing a time-averaged DSL power that it transmits to the local-end line by 6 dB or more relative to a time-averaged DSL power that it transmits thereto during the act of resuming to transmit DSL communications.

In some embodiments of the second apparatus, the DSL transceiver may be configured to transmit the DSL wait signal to the local-end line over less than a third of a set of DSL tones used by the DSL transceiver during the act of resuming to transmit DSL communications to the local-end line.

In some embodiments, the second apparatus may include a set of centrally controlled DSL transceivers including the DSL transceiver configured to perform the act of resuming. When the DSL transceiver performs the act of resuming, the set of the centrally controlled DSL transceivers is configured to precode parallel DSL data transmissions with a preceding matrix used to precode parallel DSL data transmissions just prior to the interruption or substantial stop and/or to decode parallel received DSL data communications with a decoding matrix used to decode received parallel DSL data communications just prior to the interruption or substantial stop.

BRIEF DESCRIPTION OF THE DRAWINGS

In the Figures and text, like reference symbols indicate elements with similar or the same functions and/or structures.

In the Figures, the relative dimensions of some features may be exaggerated to more clearly illustrate one or more of the structures or features therein.

Herein, various embodiments are described more fully by the Figures and the Detailed Description of Illustrative Embodiments. Nevertheless, the inventions may be embodied in various forms and are not limited to the embodiments described in the Figures and Detailed Description of Illustrative Embodiments.

DETAILED DESCRIPTION OF ILLUSTRATIVE EMBODIMENTS

Figure 1:
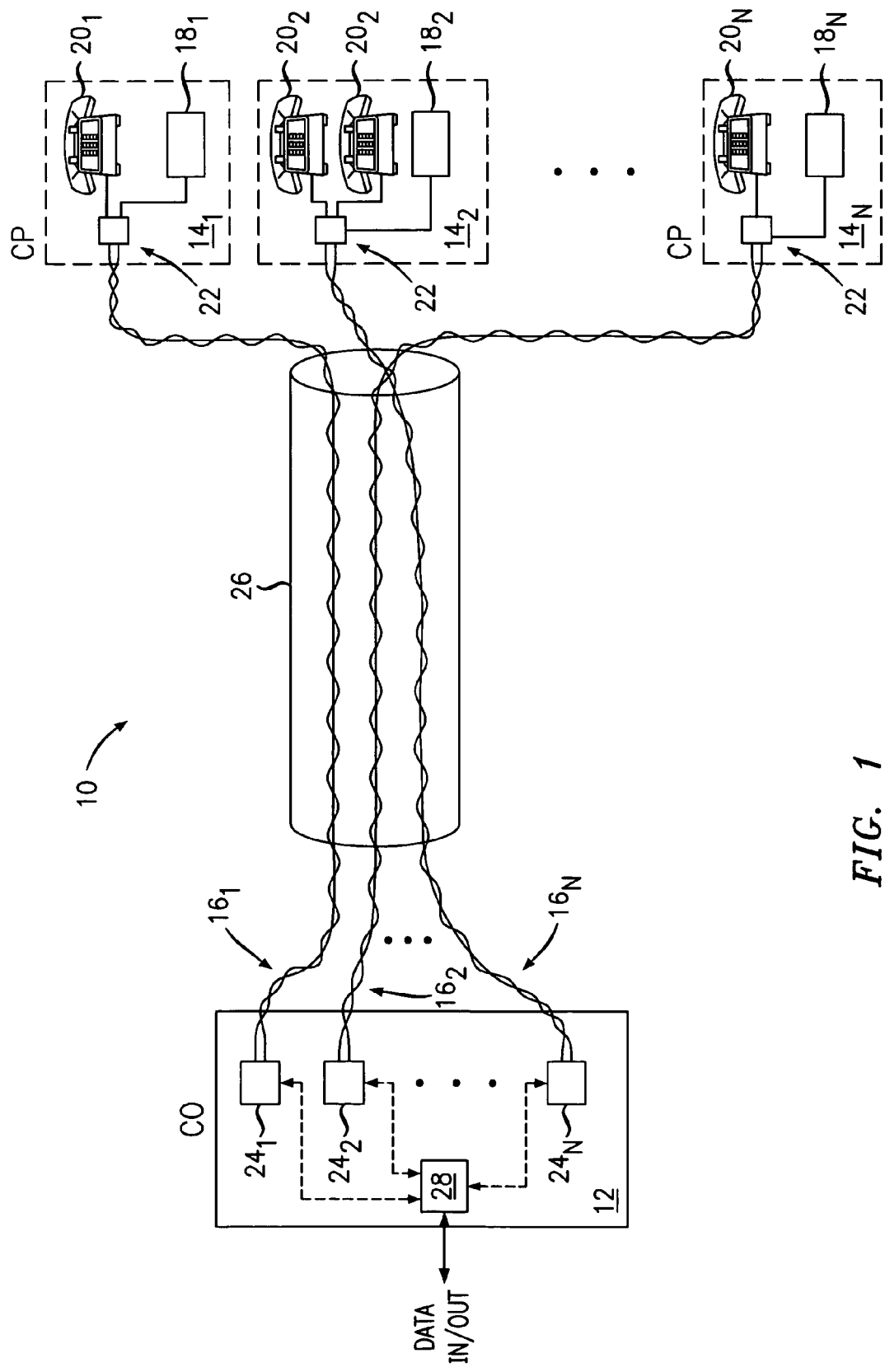
FIG. 1 is a diagram schematically illustrating a DSL communication system that supports DSL vectoring for as many as N parallel DSL communication sessions.

FIG. 1 schematically illustrates a portion 10 of an example telephone system that supports DSL data and optionally voice communications between, e.g., a central office (CO) 12 of a DSL service provider or local telephone company (telecom) and a set of customer premises equipments (CPEs) $14_1$, $14_2$, ..., $14_N$. The DSL service provider or local telecom has a set of DSL transceivers $24_1$, $24_2$, ..., $24_N$ that are centrally controlled by a single central controller 28. Each CPE $14_1$, $14_2$, ..., $14_N$ has a customer DSL transceiver $18_1$, $18_2$, ..., $18_N$, optional local wiring 22 and optional telephone(s) $20_1$, $20_2$, ..., $20_N$. The DSL transceivers $24_1$, $24_2$, ..., $24_N$ of the DSL service provider or local telecom and the customer DSL transceivers $18_1$, $18_2$, ..., $18_N$ of the CPEs $14_1$, $14_2$, ..., $14_N$ are connected through local-end lines $16_1$, $16_2$, ..., $16_N$ and any optional local wiring 22 at the CPEs $14_1$, $14_2$, ..., $14_N$. The local-end lines $16_1$, ..., $16_N$ are, e.g., ordinary local-end telephone loops such as standard twisted copper wire pairs. Each local-end line $16_1$, ..., $16_N$ connects one of the centrally controlled DSL transceivers $24_1$, ..., $24_N$ of the DSL service provider or local telecom to a corresponding one of the customer DSL transceiver $18_1$, ..., $18_N$ at the CPEs $14_1$, ..., $14_N$. The central controller 28 operates a DSL vectoring group of the centrally controlled DSL transceivers $24_1$, ..., $24_N$ of the DSL service provider or local telecom, i.e., a subset of the centrally controlled DSL transceivers $24_1$, ..., $24_N$, wherein the members of the DSL vectoring group have DSL communication sessions.

A subset of the N local-end lines $16_1$, ..., $16_N$ are susceptible to crosstalk, e.g., those of the N local-end lines $16_1$, ..., $16_N$ having segments co-located in a binder 26, e.g., a cable of the local telecom. The binder 26 may hold said subset of the local-end lines $16_1$, ..., $16_N$ in close physical proximity over long distances. For that reason, the subset of the local-end lines $16_1$, ..., $16_N$ may suffer from significant inter-line crosstalk, e.g., due to inductive coupling in the binder 26.

In the CO 12, the central controller 28 of the DSL provider or local telecom implements some form of DSL vectoring to compensate for undesired effects of crosstalk on the data uplink(s) and/or data downlink(s). In each time slot, the central controller 28 may, e.g., precode DSL data signals of a group of K parallel DSL communication sessions prior to their transmission to the centrally controlled DSL transceivers $24_1$, ..., $24_N$ of the DSL provider or local telecom for downlink transmissions to the corresponding K active customer DSL transceivers $18_1$, ..., $18_N$ of the CPEs $14_1$, ... $14_N$. In each time slot, the controller 28 may, e.g., decode DSL data signals of K parallel DSL communication sessions that are received by the K active centrally controlled DSL transceivers $24_1$, ..., $24_N$ via uplink from the corresponding K active customer DSL transceivers $18_1$, ..., $18_N$ of the CPEs $14_1$, ... $14_N$ prior to extracting K temporally parallel data streams there from. That is, the central controller 28 may implement DSL vectoring in the CO 12 for uplink and/or downlink DSL communications.

Examples of DSL systems and methods that implement techniques for DSL vectoring may be described in: U.S. application Ser. No. 12/157,461, filed on Jun. 10, 2008 (herein referred to as the '461 patent application); U.S. patent application Ser. No. 12/060,653, filed on Apr. 1, 2008; U.S. patent application Ser. No. 11/848,684, filed on Aug. 31, 2007; U.S. patent application Ser. No. 11/897,809, filed on Aug. 31, 2007; and/or U.S. patent application Ser. No. 11/897,877, filed on Aug. 31, 2007. The patent applications listed in this paragraph are incorporated herein by reference in their entirety. Apparatus, techniques, and/or methods described in these incorporated patent applications may be useful in some embodiments described herein.

Precoding K, temporally parallel, DSL communication streams, which are subject to crosstalk, typically involves evaluating a matrix product P·X for each transmission time slot and a set of DSL tones, e.g., in the central controller 28. Here, P is the K×K precoding matrix, and X is the K-vector of parallel DSL signals to be transmitted in the same time slot for a corresponding DSL tone. For each DSL tone, the index-j active one of the centrally controlled DSL transceivers $24_1$, ..., $24_N$ of the CO 12 transmits element $(P \cdot X)_j$ to the one local-end line $16_1$, ..., $16_N$ that directly connects it to the index-j active one of the customer DSL transceivers $18_1$, ..., $18_N$ at the corresponding CPE $14_1$, ..., $14_N$. Here, each of the K values of index-j corresponds to one of the K parallel DSL communication streams. Due to the precoding, the index-j active one of the customer DSL transceivers $18_1$, ..., $18_N$ will receive a DSL signal of the approximate form $D_j \cdot X_j$, i.e., a crosstalk-free form, where $D_j$ is a complex number. Such a signal form is received in the presence of crosstalk provided that other types of signal distortions such as noise are absent, i.e., $D_j \cdot X_j = (H_D \cdot P \cdot X)_j$. Thus, such precoding typically removes inter-line crosstalk, but may not remove line-dependent signal attenuation and noise. To perform such advantageous precoding, the CO 12 usually needs to evaluate the preceding matrix P for the K-dimensional DSL vectoring group, e.g., by estimating the downlink channel matrices $H_D$ for the corresponding DSL tones over the K active downlinks.

Decoding of K, temporally parallel, DSL communication streams, which are subject to crosstalk, typically involves evaluating a matrix product M·Y for each transmission time slot and a set of DSL tones, e.g., in the central controller 28. Here, M is the K×K decoding matrix, and Y is the K-vector of parallel received DSL signals for the corresponding time slot and DSL tone. In the presence of crosstalk and the absence of other signal distortions, e.g., noise, the vector Y is $H_U \cdot U$ where the index-p active customer DSL transceiver $18_1$, ..., $18_N$ transmits $(U)_p$, and K of the CPEs $14_1$, ..., $14_N$ transmit components of the vector U. The index-j element of the matrix product M·Y has the approximate diagonal form $D'_j \cdot U_j$ in the presence of crosstalk and the absence of other types signal distortions, e.g., noise. Thus, decoding typically removes crosstalk between parallel uplink DSL communications, but may not remove line-dependent attenuation or noise. To perform such advantageous decoding, the CO 12 usually needs to evaluate the decoding matrix M for the DSL vectoring group, e.g., by estimating the uplink channel matrix $H_U$ for the corresponding DSL tones over the active uplinks.

It is often desirable to evaluate the precoding and/or decoding matrices P, M when a pair of corresponding DSL transceivers $18_1$, ..., $18_N$, $24_1$, ..., $24_N$ begins or ends a DSL communication session, i.e., joins or leaves the DSL vectoring group. The DSL communications of the newly joining DSL transceiver pair may produce substantial crosstalk in the DSL data communications of those pairs of DSL transceivers $18_1$, ..., $18_N$, $24_1$, ..., $24_N$ already in the DSL vectoring group. Similarly, the DSL communications of those pairs of DSL transceivers $18_1, \ldots, 18_N, 24_1, \ldots, 24_N$ already in the DSL vectoring group may cause substantial crosstalk in DSL communications of the newly joining DSL transceiver pair. Thus, it is often useful to re-evaluate elements of the precoding matrix P and/or the decoding matrix M at such joining events and at related events where a pair of DSL transceivers $18_1, \ldots, 18_N, 24_1, \ldots, 24_N$ leaves the DSL vectoring group.

The evaluation of the precoding and decoding matrices P, M often involves performing procedures that execute during long times due to the substantial number of measurements, communications, and/or amount of computing usually involved with such an evaluation. Some of such procedures involve measuring DSL pilot signals to determine direct channel attenuations and crosstalk levels, measuring channel noise levels and/or performing handshaking operations. Indeed, the evaluation of the precoding and decoding matrices P, M may be large part of conventional initialization procedures that execute for as much as 30 seconds. To avoid situations where such long evaluation periods interfere with DSL communications, it may be advantageous to avoid evaluating such matrices, i.e., P and/or M, when such evaluations are unnecessary.

The inventors have realized that re-measuring elements of the precoding matrix P and/or the decoding matrix M may not be efficient in all situations where a pair of DSL transceivers $18_1, \ldots, 18_N, 24_1, \ldots, 24_N$ joins the DSL vectoring group. In particular, a pair of DSL transceivers may attempt to re-join the DSL vectoring group shortly after leaving said group, e.g., in response to some unexpected loss-of-signal events in which reception of DSL signals are temporarily interrupted or temporarily substantially stopped. Such unexpected loss-of-signal events may result from, e.g., transitorily disconnecting electrical contact(s) of one of the line(s) $16_1, \ldots, 16_N$, e.g., due to vibrations of the electrical contact(s), unplugging one of the active DSL transceivers $18_1, \ldots, 18_N, 24_1, \ldots, 24_N$, powering down of one of the active DSL transceivers $18_1, \ldots, 18_N, 24_1, \ldots, 24_N$, or abruptly changing an output power of one of the active DSL transceivers $18_1, \ldots, 18_N, 24_1, \ldots, 24_N$. Some such types of unexpected loss-of-signal events may be alleviated rapidly without introducing a significant change in the form of the physical communication media supporting the direct and crosstalk channels, i.e., from the form of said medium during the active communication session just prior to the unexpected loss-of-signal event. That is, the form(s) of the channel matrices $H_U$, $H_D$ for the relevant set of DSL tone frequencies may be very similar just before the unexpected loss-of-signal event and just after the alleviation of the unexpected loss-of-signal event. Examples of alleviation actions that may return a physical multi-channel communication medium substantially to its form just prior to such an unexpected loss-of-signal event may include: closing transitorily open electrical contact(s), re-plugging local wiring 22 to a DSL transceiver, and/or re-powering a DSL transceiver. After the alleviation of such an unexpected loss-of-signal event, re-use of the precoding matrix P and/or the decoding matrix M, i.e., as used by the DSL vectoring group just prior to the unexpected loss-of-signal event, may not substantially lower the quality of the crosstalk compensation afforded thereby. In addition, the re-use of such previously used preceding and/or decoding matrices P, M may typically significantly reduce the need for down time, because the pair of re-joining DSL transceivers $18_1, \ldots, 18_N, 24_1, \ldots, 24_N$ will be able to resume DSL data communications, i.e., to transmit and receive DSL data signals, without waiting for the completion of a re-evaluation of the precoding and/or decoding matrices P, M.

Various embodiments of methods and apparatus support DSL vectoring in manners that respond to loss-of-signal events, e.g., unexpected loss-of-signal events, where a pair of DSL transceiver determines that reception of DSL communications has substantially stopped, i.e., is interrupted. In response to some loss-of-signal events, the methods and systems enable resumption of DSL communications without re-measuring the precoding and/or decoding matrices P, M through a validation that bi-directional DSL communications are supported soon after the loss-of-signal event.

Figure 2:
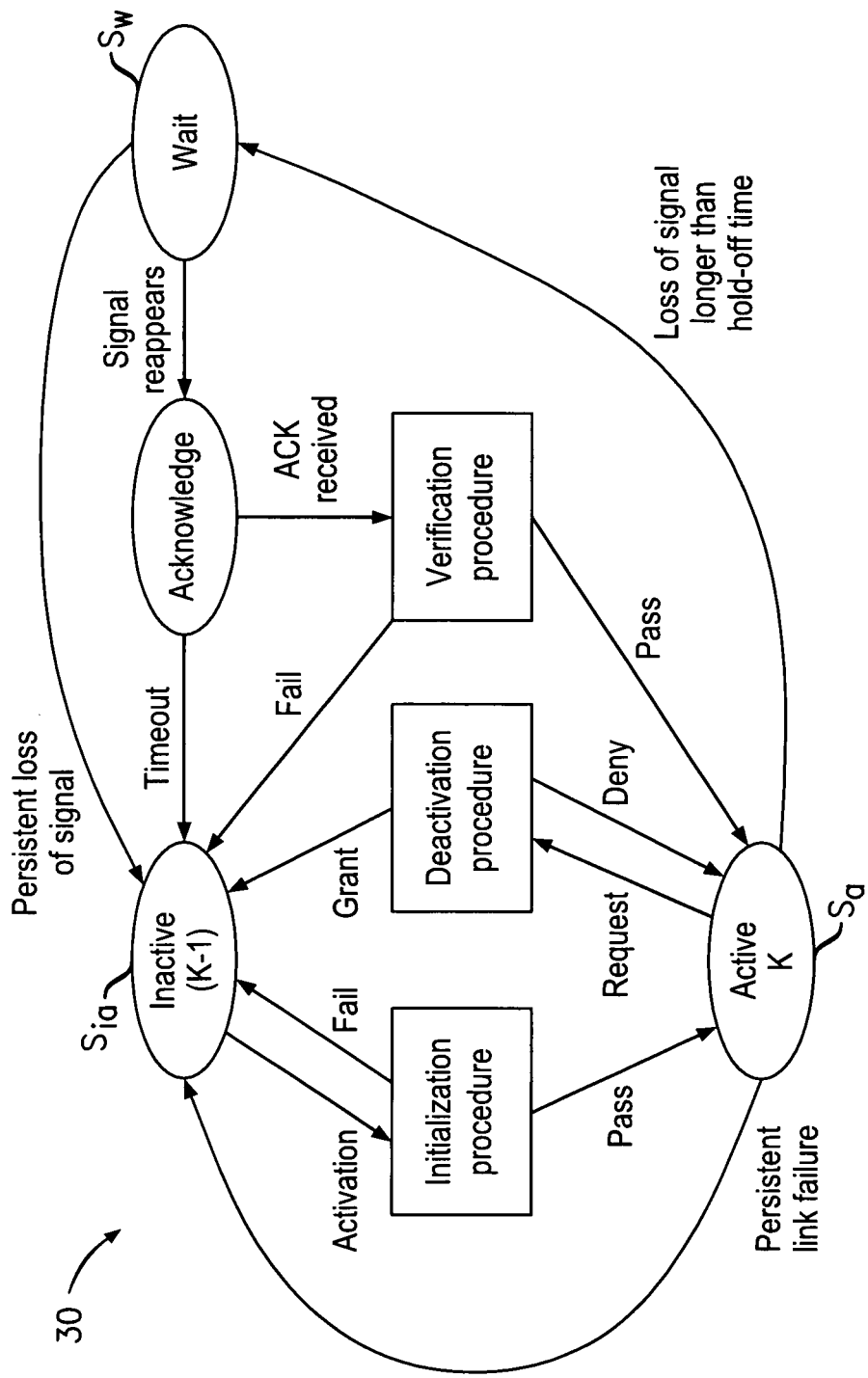
FIG. 2 is a state diagram illustrating states of an affected pair of DSL transceivers during operation of a DSL communication system, e.g., in the DSL communication system of FIG. 1.
Figure 3:
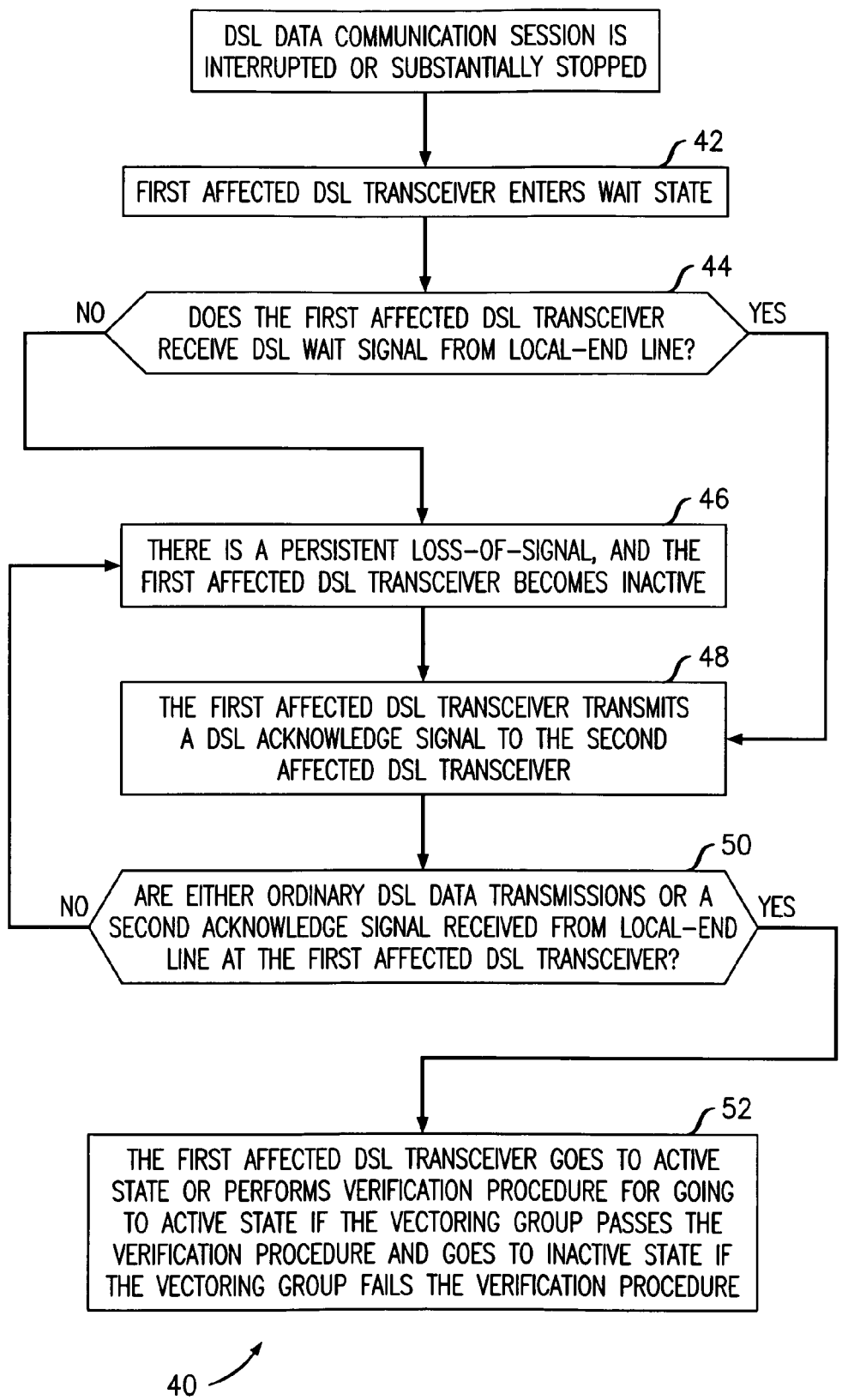
FIG. 3 is a flow chart illustrating a method of operating a first DSL transceiver of an affected pair in a DSL communication system supporting parallel DSL sessions, e.g., in the DSL communication systems illustrated by FIGS. 1 and/or 2.
Figure 4:
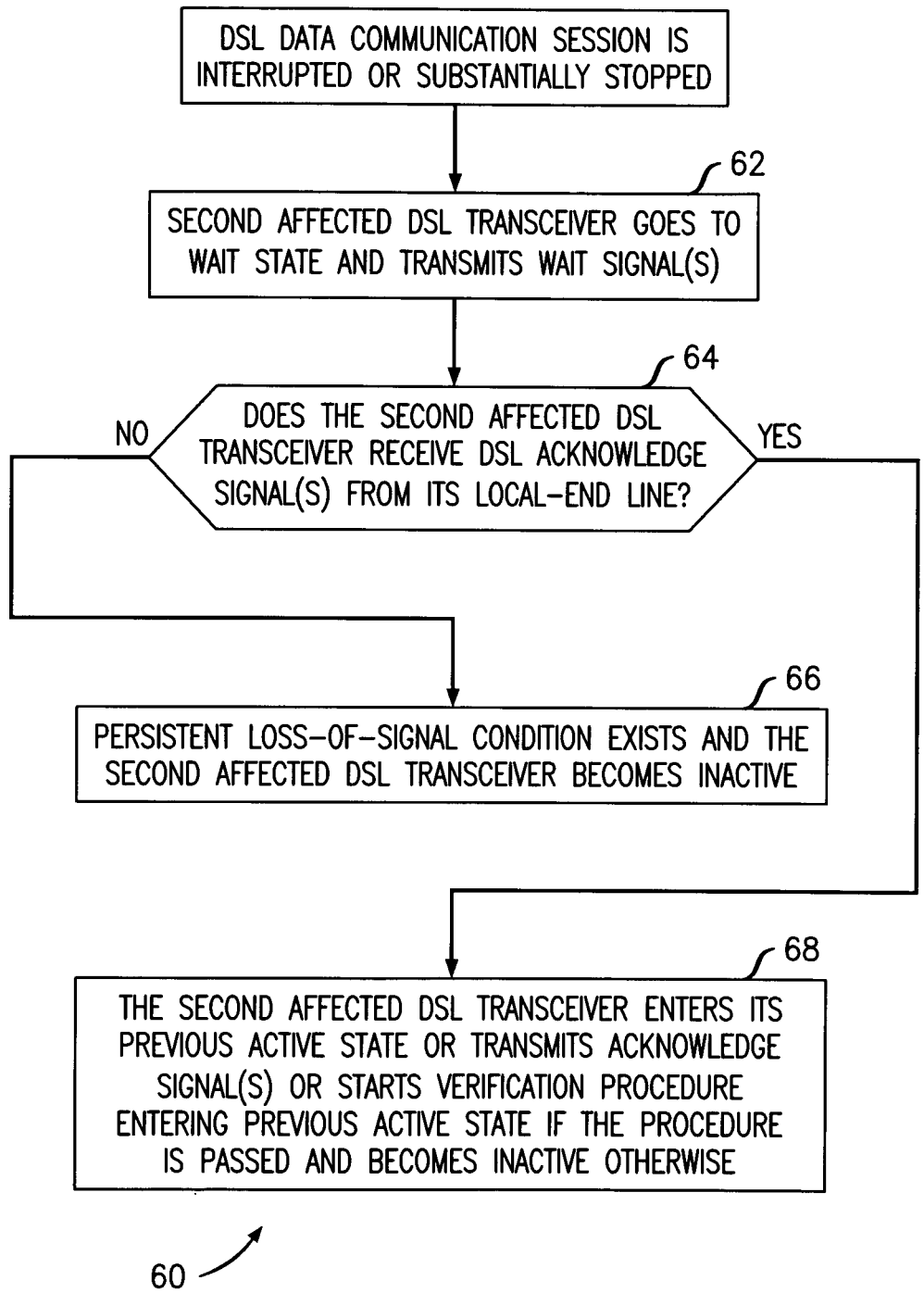
FIG. 4 is a flow chart illustrating a method of operating a second DSL transceiver of affected pair of FIG. 3, e.g., in the DSL communication systems illustrated by FIGS. 1 and/or 2.

Various embodiments of methods and apparatus are illustrated by the state diagram 30 of FIG. 2 and may be implemented, e.g., in the system 10 illustrated in FIG. 1 and/or by the methods 40, 60, 70 illustrated in FIGS. 3, 4, and/or 5. The state diagram 30 describes an affected pair of DSL transceivers in a DSL communication system having a set of N centrally controlled DSL transceivers, e.g., the DSL transceivers $24_1, \ldots, 24_N$ of the CO 12 in FIG. 1, N separately controlled DSL transceivers, e.g., the customer DSL transceivers $18_1, \ldots, 18_N$ in FIG. 1, and a set of N communications lines, e.g., the local-end lines $16_1, \ldots, 16_N$ in FIG. 1. Each of the communications lines connects one DSL transceiver of a DSL customer directly to a corresponding DSL transceiver of the DSL provider or local telecom. The DSL communication system can perform DSL vectoring that includes preceding and/or decoding of a set of temporally parallel sets of DSL data signals, e.g., in the central controller 28 of FIG. 1.

Referring to FIG. 2, the state diagram 30 illustrates various aspects of a DSL communication system as already described. The state diagram 30 illustrates the states of the pair of corresponding DSL transceivers that is directly affected by the loss-of-signal event. This pair of DSL transceivers communicates during a DSL data communication session and includes one customer DSL transceiver and one centrally controlled DSL transceiver of the DSL provider or local telecom. In FIG. 2, the active state, $S_w$, and the inactive state, $S_{ia}$, are indexed by integers K and (K−1), respectively, to indicate sizes of the DSL vector groups and minimum dimensions the precoding and decoding matrices P, M in these two states.

The state diagram 30 includes an active state, $S_a$, an inactive state, $S_{ia}$, an acknowledge state, $S_{ack}$, and a wait state, $S_w$. These states are available to the pair of DSL transceivers, which ordinarily communicates via a single local-end line (below, referred to as the affected pair). The active state $S_a$ corresponds to the state in which full or ordinary power DSL data communications occur between the DSL transceivers of the affected pair. The inactive state $S_{ia}$, the acknowledge state $S_{ack}$, and the wait state $S_w$ correspond to states in which DSL transmissions of substantially lower time-averaged power or of no power occur between the DSL transceivers of the affected pair. For example, in the wait state, $S_w$, and the acknowledge state, $S_{ack}$, the DSL transceivers of the affected pair transmit time-averaged DSL powers to their local-end line that are typically 6 dB or more, 8 dB or more, or even 10 dB or more lower than the time-averaged DSL powers transmitted thereto by said DSL transceivers during the previous active state, $S_a$. Here, time-averages may be over one, two, three, or a few consecutive DSL symbol periods or discrete multi-tone (DMT) symbol periods. In some such low power or no-power states, e.g., the $S_w$ and $S_{ack}$ states, one or both DSL transceivers of the affected pair may send one or more DSL wait and/or DSL acknowledge signals to its local-end line to inform the other DSL transceiver of the affected pair that the transmitting DSL transceiver thereof is able to resume a full power DSL data communication session. Such DSL wait and acknowledge signals are recognized by the DSL transceiver(s) by their substantially reduced power levels, by their particular signal forms, or by the power transmitted or absent for a set of DSL tones.

The affected pair of DSL transceivers can move between the different states $S_a$, $S_{ia}$, $S_{ack}$, and $S_w$ via initialization, deactivation, verification, and various timeout procedures. The illustrated pair of DSL transceivers can also move between the different states $S_a$, $S_{ia}$, $S_{ack}$, and $S_w$ in response to brief and/or persistent loss-of-signal and signal reappearance events, e.g., expected or unexpected events. Thus, both procedures and events are able to change the state of the affected pair of DSL transceivers.

In the active state $S_a$, the illustrated affected pair of DSL transceivers maintains an active DSL data communication session there between, i.e., at ordinary time-averaged DSL power levels.

In the active state $S_a$, either DSL transceiver of the affected pair may request an orderly deactivation of its DSL communication session via the deactivation procedure. For example, one of the customer DSL transceivers $18_1, \ldots, 18_N$ may make such a request when a local DSL-reliant process of the corresponding DSL customer terminates. Alternatively, one of the centrally controlled DSL transceivers $24_1, \ldots 24_N$ of the CO 12 can make such a request. If the orderly deactivation request is granted, e.g., via negotiation between the DSL transceivers of the affected pair, the affected pair of DSL transceivers makes an orderly transition to the inactive state $S_{ia}$, e.g., stopping its DSL transmissions. If the request for an orderly deactivation is denied, the affected pair of DSL transceivers remains in the active state, $S_a$, and maintains ordinary power DSL communications there between.

If the request for an orderly deactivation is granted, the size of the DSL vectoring group also decreases. If the DSL vectoring group has dimension K when the affected pair of DSL transceivers is in the active state, $S_a$, the DSL vectoring group will have the dimension (K−1) in the inactive state, $S_{ia}$, to which the deactivation procedure transits the DSL communication system. Thus, for example, the CO 12 could replace precoding and/or decoding matrices P, M, which are K×K matrices in the active state, $S_a$, by (K−1)×(K−1) matrices P, M after the transition by the affected pair to the inactive state, $S_{ia}$.

In the inactive state $S_{ia}$, the affected pair of DSL transceivers of FIG. 2 does not maintain a DSL communication session. But, the affected pair or another inactive pair of DSL transceivers can request a subsequent transition to an active state, $S_a$, via an initialization procedure that involves the inactive pair and any active DSL transceiver pairs. The initialization procedure enables the inactive pair of DSL transceivers to start or restart a full or ordinary power DSL communication session, i.e., to join or re-join the DSL vectoring group. If the requested initialization procedure succeeds, one more pair of DSL transceivers passes to the active state, $S_a$, in which, at least, said pair of DSL transceivers is added to the DSL vectoring group. If the initialization procedure fails, the pair remains in the inactive state, $S_{ia}$, and no changes are made to the size or transceiver pair content in the DSL vectoring group.

After the transition to the active state, $S_a$, K pairs of DSL transceivers maintain temporally parallel, DSL communication sessions, and the precoding and/or decoding matrices P, M are K×K dimensional matrices. Thus, the initialization procedure typically determines new elements of the larger precoding matrix P and/or the larger decoding matrix M as needed for the new DSL vectoring group of dimension K. In some embodiments, this determination may involve transmitting and measuring pilot signals between some of the K DSL transceivers $24_1, \ldots, 24_N$ of the CO 12 and some of the K customer DSL transceivers $18_1, \ldots, 18_N$ in the desired new vectoring group.

The DSL transceivers of the affected pair can also make a transition from the active state, $S_a$, to the wait state, $S_w$, in response to determining that reception of DSL communications between these DSL transceivers has been interrupted or substantially stopped, at least, in one direction, e.g., unexpectedly interrupted of substantially stopped. Such situations will be referred to as loss-of-signal events. For example, an unexpected loss-of-signal event may occur when one or more of the K lines $16_1, \ldots, 16_N$ of FIG. 1 corresponding to active states, $S_a$s, is/are interrupted or broken or when one or more of the K active DSL transceivers of DSL customers unexpectedly powers down as already discussed above.

In the wait state, $S_w$, either one DSL transceiver of the affected pair or each DSL transceiver of the affected pair monitors for reception of a low power DSL wait signal from the other DSL transceiver of the pair. In the wait state, $S_w$, both DSL transceivers of the pair substantially reduce their DSL power transmitted to the local-end line that previously connected the pair. The DSL transceivers of the pair may transmit reduced power continuity-type signals, i.e., DSL wait signals, to the local-end line in the wait state, $S_w$. For example, in the wait state $S_w$, one or both of the affected DSL transceivers may transmit DSL wait signals to the local-end line, e.g., over a sparse and proper subset of the set of DSL tones available to carry DSL data communications during the active state, $S_a$. The sparse and proper subset may include, e.g., less than or equal to ⅓ of the number of DSL tones available for the full power DSL data communications during the active state, $S_a$. The sparse and proper subset may include, e.g., the few lowest frequency DSL tones used for such full power DSL data communications. The DSL tones used for the DSL wait signals are selected to produce, at most, low crosstalk interference in the remaining active DSL communication sessions, i.e., between the remaining (K−1) active transceiver pairs of the previous K-dimensional DSL vectoring group. For example, limiting such transmissions of DSL wait signals to reduced power signals and/or to a small number of DSL tones can reduce interference with the DSL data communications of the remaining (K−1) active DSL communication sessions. By monitoring this sparse and proper subset of the set of DSL tones for DSL wait signals and/or DSL acknowledge signals, one or both DSL transceivers of the affected pair may determine when the event causing the interruption or substantial stop of DSL communications has been alleviated. In response to determining that an alleviation of the loss-of-signal event has occurred, the affected pair of DSL transceivers can try to substantially resume their previous active DSL data communication session, e.g., using the stored matrices P and M, which were used during the active state, Sa, just prior to the loss-of-signal event. When resuming the previous active state, $S_a$, the CO 12 can use the previously stored precoding and decoding matrices P, M, i.e., from just prior to the unexpected interruption or substantial stop of the DSL communication session between the affected pair, or can use precoding and/or decoding matrices with small differences from such earlier stored P and/or M matrices.

A brief loss-of-signal induces a transition from the active state, $S_a$, to the wait state, $S_w$, but may not effectively decrease, e.g., the number of active pairs DSL transceivers that are communicating some data. In particular, one or both DSL transceivers of the affected pair may still transmit DSL signals at a substantially reduced power in the wait state, $S_w$. The reduced power DSL transmissions aid one or both DSL transceivers of the affected pair to determine whether their DSL link has been restored. The transition to the wait state, $S_w$, typically also does not require that the preceding matrix P or the decoding matrix M be updated. Indeed, the previously used preceding and/or decoding matrices P and/or M are typically useable in the presence of such DSL transmissions of substantially reduced power by one or both DSL transceivers of the affected pair in the wait state, $S_w$, and in the acknowledge state, Sack. The inventors believe that for the low power transmissions during these states, the previous matrices P and/or M matrices will typically provide substantial compensation of the undesired effects of inter-line crosstalk for the other (K−1) pairs of DSL transceivers that are actively communicating data.

Nevertheless, in the wait state $S_w$, a determination that the loss-of-signal event is persistent, e.g., continues more than a preset time of substantial length, will typically result in the DSL transceivers of the affected pair making a transition from the wait state, $S_w$, to the inactive state, $S_{ia}$. Such a transition decreases the total number of transmitting pairs DSL transceivers by one so that the preceding matrix P and/or decoding matrix M may then, be replaced by matrices appropriate for a DSL vectoring group of dimension (K−1).

The affected pair of DSL transceivers passes from the wait state, $S_w$, to the acknowledge state, $S_{ack}$, in response to one or both of the DSL transceivers of the pair detecting a DSL wait signal from the other DSL transceiver of the pair within a preset maximum wait period, i.e., via receipt from their local-end line. In response to detecting a DSL wait signal, the DSL transceiver that detects the DSL wait signal will transmit a DSL acknowledge signal (ACK), i.e., another DSL signal of low power and/or over a reduced number of DSL tones, to the other DSL transceiver of the affected pair. If the other DSL transceiver of the affected pair receives the DSL acknowledgement signal prior to the end of a preset timeout period, that DSL transceiver can "validate" that its local-end line is again ready to support bi-directional DSL communications. Then, affected pair typically can proceed to resume a bi-directional DSL communication session, e.g., in which the K-dimensional DSL vectoring group uses the precoding matrix P and/or decoding matrix M used just prior to the loss-of signal event. That is, receipt of the DSL acknowledge signal indicates or validates to the receiving DSL transceiver of the affected pair that its DSL link is again capable of supporting DSL signals in both the uplink and the downlink directions.

Receipt of a DSL acknowledge signal may provoke the affected pair to resume ordinary DSL communications in two different ways. In symmetric embodiments, each DSL transceiver of the affected pair transmits a DSL wait signal in the wait state, $S_w$, and transmits a DSL acknowledge signal in the acknowledge state, $S_{ack}$, i.e., in response to detecting a DSL wait signal. In such embodiments, receipt of a DSL acknowledge signal may directly cause the receiving DSL transceiver to resume ordinary DSL transmissions, i.e., at the higher ordinary or full power level. In asymmetric embodiments, only a second of the DSL transceivers of the affected pair transmits a DSL wait signal in the wait state, $S_w$, and a first of the DSL transceivers of the pair transmits the DSL acknowledge signal in the acknowledge state, $S_{ack}$, i.e., responsive to detecting the DSL wait signal. In such embodiments, receipt of the DSL acknowledge signal directly causes the second of the DSL transceivers of the affected pair to either resume ordinary DSL transmissions, i.e., at the higher ordinary or full power level, or to transmit a DSL second acknowledge signal. In such embodiments, the first of the DSL transceivers of the affected pair may resume ordinary or full power DSL transceivers in response to either detecting that the second of the DSL transceivers of the affected pair has resumed such ordinary or full power DSL transmissions or in response to receiving the second DSL acknowledge signal from the second of the DSL transceivers, i.e., responsive to the first DSL acknowledge signal. In the later case, both DSL transceivers of the affected pair can then resume a DSL communication session at ordinary or full power levels.

In some embodiments, such a transition from the acknowledge state, $S_{ack}$, to the active state, $S_a$, may also involve performing an added optional verification procedure. The verification procedure further confirms that communication properties of the DSL vectoring group have not significantly changed from their values just prior to the loss-of-signal event, e.g., from their values immediately prior to the interruption or substantial stop of the previous active DSL communication session between the affected pair. The optional verification procedure may include measuring one or a few elements of the uplink and/or downlink matrices $H_U$, $H_D$, e.g., for a few DSL tones, and/or measuring a few other DSL transmission parameters. The optional verification procedure confirms, e.g., that a small number of said matrix elements and/or parameters have not changed by more than preselected amounts. The optional verification procedure can be very rapid, because it does not target explicitly confirming, e.g., that all or a substantial number of the crosstalk-related matrix elements for the affected pair have not significantly changed.

The affected pair of DSL transceivers may pass from the acknowledge state, $S_{ack}$, to the inactive state, $S_{ia}$, in response to a failure of such a verification procedure to confirm an absence of significant changes in the tested ones of the above-described physical channel properties. Such a failure typically indicates that precoding and decoding matrices P, M needed to provide the desired level of crosstalk compensation in the DSL system will have forms that substantially differ from the forms of said matrices just prior to the loss-of-signal event.

FIGS. 3 and 4 illustrate coordinated methods 40, 60 to be performed by the affected centrally controlled affected DSL transceiver of a DSL provider or local telecom and its controller, e.g., one of the centrally controlled DSL transceivers $24_1, \ldots 24_N$ and the central controller 28 of FIG. 1, and the affected customer DSL transceiver, e.g., one of the customer DSL transceivers $18_1, \ldots, 18_N$ of FIG. 1, in response to a loss-of-signal event. The methods 40, 60 provide an example implementation of the state diagram illustrated in FIG. 2—the implementation being either symmetric or asymmetric. Prior to the loss-of-signal event, the affected pair of DSL transceivers are linked by a corresponding local-end line, e.g., one of the lines $16_1, \ldots, 16_N$ of FIG. 1.

In one embodiment, the affected centrally controlled DSL transceiver of the DSL provider or local telecom and its controller, e.g., the CO 12 of FIG. 1, perform the steps of the first method 40. In this embodiment, the affected customer DSL transceiver, e.g., one of the customer DSL transceivers $18_1, \ldots, 18_N$ of FIG. 1, performs the steps of the second method 60.

In a different embodiment, the affected centrally controlled DSL transceiver of the DSL provider or local telecom and its controller, e.g., the CO 12 of FIG. 1, perform the steps of the second method 60. In this embodiment, the affected customer DSL transceiver, e.g., one of the customer DSL transceivers $18_1, \ldots, 18_N$ of FIG. 1, performs the steps of the first method 40.

To describe both embodiments, the descriptions with respect to FIGS. 3 and 4 refer to a first affected DSL transceiver and a corresponding second affected DSL transceiver or to the pair of affected DSL transceivers. In these descriptions, affected one of customer DSL transceivers can function as either the first or the second affected DSL transceiver provided that one of the centrally controlled DS transceivers of the DSL provider or local telecom and its central controller function as the remaining one of the affected DSL transceivers.

Prior to performance of the steps of the methods 40, 60, the DSL vectoring group includes K pairs of DSL transceivers in the active state, Sa. Then, a loss-of-signal event, e.g., an unexpected loss-of-signal event, adversely affects the DSL data communication session between the active DSL transceivers of the affected pair. In particular, the loss-of-signal event results from a physical condition that interferes with or substantially stops ordinary bi-directional DSL data communications between the pair. The initial loss-of-signal event may physically interrupt or substantial stop DSL data communications in only an uplink direction, only a downlink direction, or both the uplink and downlink directions. For example, uplink and downlink DSL data communications may be carried by DSL tones of different frequency, and attenuation over the local-end line may be frequency dependent, e.g., due to high frequency capacitive shorts thereto. In such situations, the interruption or substantial stop of the DSL communication session may be either directionally asymmetric or directionally symmetric.

In response to recognizing an interruption or substantial stop of a DSL data communication session, one DSL transceiver of the affected pair enters the wait state, $S_w$, in which that DSL transceiver substantially reduces the DSL power transmitted to its local-end line. The DSL transceiver may recognize the interruption or substantial stop of the DSL data communication session by detecting a substantial decrease in a time-averaged power in DSL signals received form its local-end line. For example, recognition of the interruption or substantial stop may result from a measurement of a decrease in such a power for received DSL signals of 6 dB or more, 8 dB or more, or even 10 dB or more, e.g., a decrease with respect to the previous active state, $S_a$. Here, time averages may be over one, two, three or more DSL symbol periods or DMT symbol periods, e.g., the average may be based on a Fourier coefficient for a low or zero frequency, and may or may not include averages over multiple DSL tones. By recognizing the initial interruption or substantial stop in the original active state, $S_a$, or the resulting sudden reduction in a received DSL power due to entry of the one DSL transceiver into the wait state, SW, the remaining DSL transceiver of the affected pair will also recognize the decrease in DSL power received from its local-end line and will enter the wait state, $S_w$. In the wait state, $S_w$, the remaining DSL transceiver of the affected pair also substantially reduces the DSL power that it transmits to its local-end line, e.g., as described above for the other DSL transceiver of the pair.

Referring to FIG. 3, shortly after the interruption or substantial stop of DSL data communications in one direction, e.g., received DSL communications, the first affected DSL transceivers enters the wait state, SW (step 42). In the wait state, the first affected DSL transceiver either does not transmit DSL signals to its local-end line or transmits DSL signals thereto at a substantially reduced average power level.

In the wait state, $S_w$, and the acknowledge state, $S_{ack}$, the affected pair of DSL transceivers both transmit a substantially reduced DSL power to their local-end line, i.e., the line previously connecting these DSL transceivers. For example, in these states, DSL signals may be transmitted via one or only a few of the DSL tones available for ordinary or full-power DSL data communications over this local-end line in an active state, $S_a$. Also, such DSL signals may be transmitted at a reduced time-averaged power level, e.g., at a power level that is reduced by 6 dB or more, by 8 dB or more, or even by 10 dB with respect to the average DSL power level transmitted to the same local-end line during the previous active state, $S_a$.

The substantial reduction of such DSL powers transmitted to this local-end line during the wait and acknowledge states, i.e., $S_w$ and $S_{ack}$, may substantially reduce crosstalk in the remaining (K−1) active DSL communication sessions. In the absence of such a power reduction, such crosstalk might otherwise be substantially uncompensated, e.g., because a physical interruption of a local-end line can change the line's inductive couplings with the other local-end lines supporting the (K−1) remaining active DSL data communication sessions. The substantial reduction in the DSL power transmitted to their local-end line by the affected pair of DSL transceivers often enables the use of the previous preceding and decoding matrices P, M during the wait and acknowledge states, i.e., $S_w$ and $S_{ack}$, without the production of high crosstalk levels in these remaining (K−1) active DSL data communication sessions.

During the wait state, $S_w$, the first affected DSL transceiver regularly monitors for receipt of a DSL wait signal from its local-end line, i.e., the line connected directly thereto during the previous active state, $S_a$ (step 44). From the detection of a received DSL wait signal or the absence thereof within a preset time of the start of the wait state, $S_w$, the first affected DSL transceiver determines whether the second affected DSL transceiver is able to resume ordinary DSL data transmissions.

In response to the absence of receipt of a DSL wait signal within the preset time, i.e., at the step 44, the first affected DSL transceiver determines that a persistent loss-of-signal condition exists and transits to the inactive state, $S_{ia}$ (step 46). In the inactive state, $S_{ia}$, the first DSL transceiver stops monitoring for DSL wait signals and typically stops transmitting DSL signals to its local-end line.

In response to receipt of a DSL wait signal within the preset time, i.e., at the step 44, the first affected DSL transceiver transits to the acknowledge state, Sack (step 48). In the acknowledge state, $S_{ack}$, the first affected DSL transceiver regularly transmits a DSL acknowledge signal to its local-end line. A subsequent receipt of the DSL acknowledge signal will indicate to the second affected DSL transceiver that the first affected DSL transceiver is receiving the DSL wait signals from the second affected DSL transceiver and is also able to transmit DSL signals to the second affected DSL transceiver. That is, receipt of the DSL acknowledge signal validates to the second DSL transceiver that an ordinary bi-directional DSL data communication session can be established, e.g., by resuming the previous active state, $S_a$.

After starting to transmit the DSL acknowledge signal, the first affected DSL transceiver monitors its local-end line for either ordinary DSL data transmission(s) or a second DSL acknowledge signal, i.e., within a second preset time (step 50). Receipt of either type of DSL signal responsive to transmission of the DSL acknowledge signal at step 48 validates to the first affected transceiver that an ordinary bi-directional DSL data communication session can be established, e.g., by resuming the previous active state, $S_a$.

In response to detecting either the ordinary DSL data transmissions or the second DSL acknowledge signal within the second preset time, the first affected DSL transceiver transits to a new active state, $S_a$ (step 52). At step 52, the transition to the new active state, $S_a$, may require, in some embodiments, the performance and passing of an optional verification procedure as already described.

In the new active state, the DSL vectoring group again has its previous K active pairs of DSL transceivers. For that reason, the central controller of the K centrally controlled DSL transceivers, e.g., of the CO 12 of FIG. 1, may be able to re-use the precoding matrix P and/or the decoding matrix M, i.e., as used just prior to the loss-of-signal event.

In some embodiments, the central controller 28 or CO 12 of FIG. 1 may perform the above-mentioned verification procedure prior to the resumption of ordinary bi-directional DSL data communications between the first and second affected DSL transceivers in the new active state, Sa, at the step 52. The verification procedure may involve, e.g., measuring element(s) of the uplink and/or downlink channel matrices $H_U$, $H_D$, e.g., for a few DSL tones, to re-evaluate physical crosstalk properties of the DSL vectoring group and/or to measure one or more other DSL transmission parameters. In response to the previous K DSL vectoring group passing the verification procedure, the central controller causes the first affected DSL transceiver to resume ordinary bi-directional DSL data communications with the second affected DSL transceiver, e.g., in the previous active state, Sa. In response to the K DSL transceiver vectoring group failing the verification procedure, the affected pair of DSL transceivers pass to the inactive state, $S_{ia}$.

From the inactive state $S_{ia}$, the previously affected and now inactive pair of corresponding DSL transceivers would typically be returned to an active state, Sa, after new measurements of the uplink and downlink channel matrices. From such measurements, the relevant elements of the preceding matrix P and the decoding matrix M can be re-initialized. Thus, a persistent interruption or a persistent substantial stop of a DSL communication session may result in a need for performing the initialization procedure of FIG. 2 so that the DSL transceiver pair can rejoin the DSL vectoring group. The performance of such an initialization procedure will typically determine suitable values for the elements of the preceding matrix P and the decoding matrix M albeit via a more time-consuming procedure than that associated with the wait and acknowledge states, i.e., $S_w$ and $S_{ack}$, as described above.

Referring to FIG. 4, in response to the interruption or substantial stop of the receipt of DSL data communications, the second affected DSL transceiver enters the DSL wait state, SW, according to the method 60 (step 62). In the wait state, SW, the second affected DSL transceiver regularly transmits a DSL wait signal to its local-end line, e.g., over a preselected set of the DSL tones that is more limited than the set used by the second DSL transceiver during the previous active state, $S_a$. In the wait state, $S_w$, the transmission of DSL wait signals is at a time-averaged power substantially reduced with respect to time-averaged power that the second affected DSL transceiver used to transmit DSL data to the same local-end line during the immediately previous active state, Sa. The DSL wait signals may be transmitted, e.g., with a time-averaged power that is 6 dB or more, 8 dB or more, or even 10 dB or more lower than the DSL power transmitted by the second affected DSL transceiver to its local-end line during the immediately previous active state, Sa. Here, time-averaged powers may also be averaged over the full set of DSL tones for ordinary use on the local-end line. The substantial reduction in the DSL power transmitted to this local-end line may substantially reduce crosstalk in the remaining (K−1) active DSL communication sessions. As discussed, the reduced DSL power on the affected local-end line often enables continued use of the previous precoding and decoding matrices P, M without an unacceptably high crosstalk level on any of the other active local-end lines.

During the wait state, $S_w$, and any subsequent acknowledge state, $S_{ack}$, the second DSL transceiver of the affected pair also regularly monitors for receipt of a DSL acknowledge signal from its local-end line (step 64). From a detection of a DSL acknowledge signal or an absence thereof, the second affected DSL transceiver determines whether ordinary or full power bi-directional DSL data communications can be resumed.

In response to the absence of receipt of such a DSL acknowledge signal at the step 64, i.e., within a preset time of entry into the wait state, $S_w$, the second DSL transceiver determines that a persistent loss-of-signal condition exists and enters the inactive state, $S_{ia}$ (step 66). In the inactive state, $S_{ia}$, the second DSL transceiver stops transmitting DSL wait signals to its local-end line and may stop transmitting any DSL signals to its local-end line.

In response to receiving a DSL acknowledge signal at the step 64, within the preset time from its entry into to the wait state, $S_w$, the second DSL transceiver of the affected pair enters the previous active state, $S_a$, or optionally starts the above-described verification procedure (step 68). The receipt of the DSL acknowledge signals validates to the second DSL transceiver that the affected pair can now engage in bi-directional DSL signaling via their local-end line. In particular, the receipt of the DSL acknowledge signal implies that the first affected DSL transceiver of the affected pair has received a DSL signal from the second affected DSL transceiver and that the second affected DSL transceiver has also received a DSL signal from the first affected DSL transceiver.

In some embodiments, the first affected DSL transceiver of the affected pair will participate in the above-described verification procedure in response to detecting that the second affected DSL transceiver of the affected pair has started to perform the verification procedure. The affected pair of DSL transceivers will transit to the inactive state, $S_{ia}$, if the original DSL vectoring group of K pairs of DSL transceivers fails the verification procedure, i.e., because a failure indicates a probable substantial change in the compensation needed to remove undesired effects of inter-line crosstalk. The affected pair will transit to its previous active state, $S_a$, if the original DSL vectoring group with K pairs of DSL transceivers passes the verification procedure.

Figure 5:
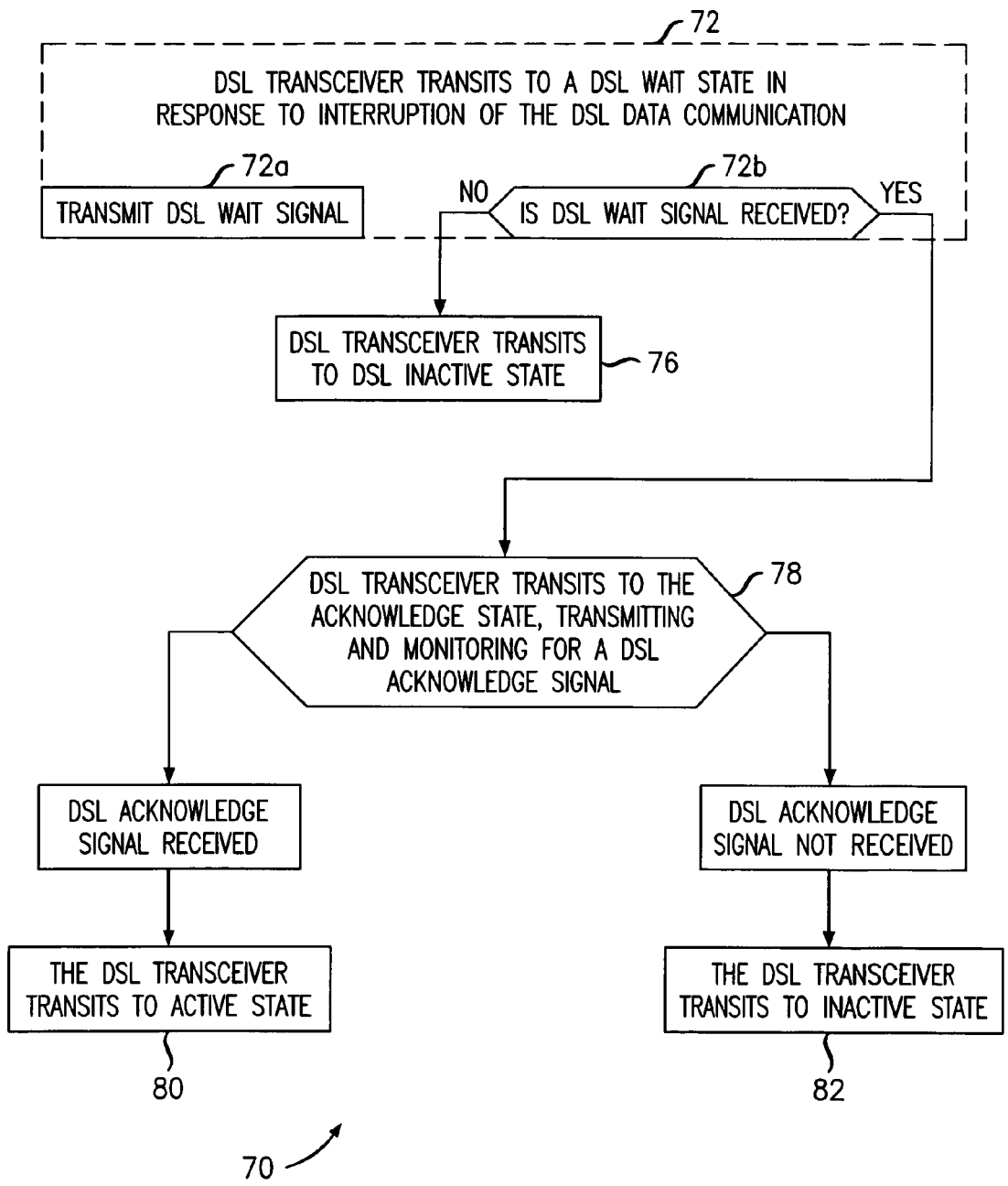
FIG. 5 is a flow chart illustrating a symmetric method of operating DSL transceivers of an affected pair, e.g., in DSL communication systems illustrated by FIGS. 1 and/or 2.
Figure 6:
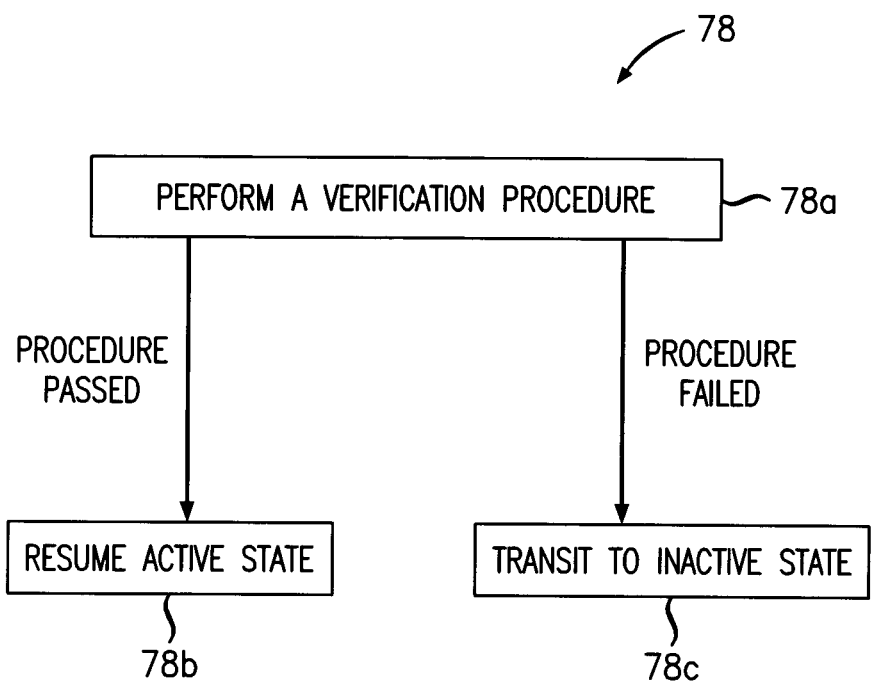
FIG. 6 is a flow chart illustrating an optional verification step of some embodiments of the method illustrated in FIG. 5.

FIGS. 5 and 6 illustrate, in more detail, an embodiment of a symmetric method 70 of responding to unexpected interruptions or substantial stops of a DSL data communication session. In the method 70, the two DSL transceivers of the affected pair respond in a symmetric manner to the unexpected interruption or substantial stop of a DSL communication session there between.

The method 70 includes that each DSL transceiver of the affected pair transits to the wait state, $S_w$, in response to the unexpected interruption or substantial stop of a DSL data communication there between (step 72).

In the wait state, $S_w$, of the step 72, each DSL transceiver of the affected pair transmits a DSL wait signal to its local-end line at regular intervals (substep 72a).

In the wait state, $S_w$, of the step 72, each DSL transceiver of the affected pair also regularly monitors for receipt of a DSL wait signal from its end of its local-end line (substep 72b).

In response to absence of receipt of a DSL wait signal from its local-end line within a preset time, i.e., at the substep 72b, each DSL transceiver of the affected pair will determine that a persistent loss-of-signal condition exists and transit to the inactive state, $S_{ia}$ (step 76). In the inactive state, $S_{ia}$, the DSL transceivers stop monitoring for DSL wait signals and typically stop transmitting DSL signals to the local-end line.

In response to receipt of a DSL wait signal within the preset time, i.e., at the substep 72b, each DSL transceiver of the affected pair transits to the acknowledge state, $S_{ack}$ (step 78). In the acknowledge state, $S_{ack}$, each DSL transceiver of the affected pair regularly transmits a DSL acknowledge signal to its local-end line and regularly monitors for receipt of a DSL acknowledge signal from its end of the local-end line.

In the method 70, the DSL transceivers of the affected pair transmit DSL signals of substantially reduced power to their local-end line in the wait state, $S_w$, and in the acknowledge state, $S_{ack}$. For example, in these states, DSL signals may be transmitted via one or only a few of the DSL tones available for ordinary or full-power DSL data communications over their local-end line. Also, such DSL signals may be transmitted at a reduced time-averaged power level, e.g., at a power level that is reduced by 6 dB or more, by 8 dB or more, or even by 10 dB with respect to the average DSL power level transmitted to the same local-end line by each of the affected DSL transceivers during their immediately previous active state, $S_a$.

In response to receiving a DSL acknowledge signal within a preset time of the start of its acknowledge state, $S_{ack}$, each DSL transceiver of the affected pair transits to the new active state, Sa (step 80). In this new active state, the DSL vectoring group may use the precoding and/or decoding matrices used in the previous active state, $S_a$.

In response to not receiving a DSL acknowledge signal within the preset time from the start of its acknowledge state, $S_{ack}$, each DSL transceiver of the affected pair will transit to the inactive state, $S_{ia}$ (step 82). Such situations arise, e.g., in the case of a persistent loss-of-power over their corresponding local-end line, e.g., in uplink and/or downlink directions. In the inactive state, $S_{ia}$, the DSL transceivers of the affected pair stop monitoring for DSL acknowledge signals and typically stop transmitting DSL signals.

FIG. 6 illustrates one specific embodiment of the method 70 of FIG. 5. In the specific embodiment, the step 78 of transiting to a new active state in the method 70 is modified. In the specific embodiment, the step 78 of transiting to a new active state also includes performing an optional verification procedure (substep 78a).

Performance of the verification procedure is started responsive to receiving the DSL acknowledge signals by one or both DSL transceivers of the affected pair. The original DSL vectoring group of K DSL modem pairs may pass or fail the verification procedure. The verification procedure may include tests already described, e.g., with respect to FIG. 2.

In response of the DSL vectoring group passing the optional verification procedure, the DSL transceivers of the affected pair resume the active state, Sa (substep 78b). The resuming substep 78 also may include that the set of centrally controlled DSL transceivers of the DSL vectoring group perform precoding and/or decoding based on the precoding and decoding matrices P, M that were used in the previous active state, $S_a$.

In response of the DSL vectoring group failing the optional verification procedure, the DSL modems of the affected pair transit to the inactive state, $S_{ia}$ (substep 78c). The failure of the optional verification usually indicates that the previous preceding and decoding matrices P, M are now unsuitable for compensating inter-line crosstalk. Thus, the much more time-consuming initialization procedure, which is illustrated in FIG. 2, may be subsequently performed to transit the DSL transceivers of the affected pair to a new active state, $S_a$. Such a new active state would typically be based on different and more suitable precoding and decoding matrices P, M.

Referring to FIGS. 3-6, various embodiments of the methods 40, 60, 70 may use different definitions for the loss-of-signal event that provokes the DSL transceivers of the affected pair to transit from the active state, Sa, to the wait state, $S_w$, in FIG. 2. For example, in some embodiments, the transition from the active state, $S_a$, to the wait state, $S_w$, may be performed after a reduction in DSL signal power for a very short period of time. Such a rapid transition to the wait state, $S_w$, can reduce the undesired effects of uncompensated inter-line crosstalk on the (K−1) other local-end lines of the DSL vectoring group when DSL communications are interrupted for the affect pair by a sudden physical event, e.g., a mechanical disconnection of the corresponding local-end line. The rapid transition can reduce such undesired crosstalk effects, because the DSL transceivers of the affected pair substantially reduce their DSL transmission powers rapidly when the event that may change the needed form for crosstalk compensation occurs. Such rapid transitions may however, be provoked by very transient physical channel conditions that are self-alleviated thereby returning the shared channel to its early state, e.g., with the previous uplink and downlink channel matrices, $H_U$, $H_D$. Thus, embodiments implementing such rapid transitions to the wait state, $S_w$, may also support rapid transitions from the wait state, $S_w$, and/or the acknowledge state, $S_{ack}$, back to the previous active state, $S_a$, in response to a determination that loss-of-signal event was very short. For example, one or both DSL transceivers of the affected pair may determine that the loss-of-signal event was very short in response to receiving a DSL wait signal very soon after entering the wait state, $S_w$. Such embodiments may be based on an assumption that full bi-directional communications will be supported for such short loss-of-signal events and that further verification of the channel condition is unneeded.

Referring to FIGS. 2-5, some embodiments of the methods 40, 60, 70 may transit the DSL transceivers of the affect pair from the active state, $S_a$, to the inactive state, $S_{ia}$, if the compensation of inter-line crosstalk for the DSL vectoring group is found to be insufficient within a preset short time after the affected pair resumes the active state, $S_a$. In particular, some such embodiments may assume that the rapid degradation of the compensation of inter-line crosstalk has resulted from an improper resumption of the DSL data communication session of the affected pair, e.g., due to a substantial and undetected change elements of the uplink and downlink channel matrices, $H_U$, $H_D$. Thus, the affected pair of DSL transceivers may transit to the inactive state, $S_{ia}$, so that the full initialization procedure of FIG. 2 can be used to determine a better configuration for compensating such inter-line crosstalk.

The methods 40, 60, 70, i.e., as illustrated in FIGS. 3-5, may provide an improvement over the methods in the above-incorporated '461 patent application due to the ability of two methods 40, 60 to determine when bi-directional DSL data communications are supported between a affected pair of DSL transceivers.

Herein, steps of described methods, e.g., the methods 40, 60 of FIGS. 3-4, may be performed by machine-executable programs of instructions, wherein the programs are encoded on a digital storage media in machine-readable form, e.g., readable by a computer. The digital storage media may be, e.g., a magnetic tape, a magnetic disk, an optical disk, a digital active memory, and/or a hard drive.

From the disclosure, drawings, and claims, other embodiments of the invention will be apparent to those skilled in the art.

What is claimed is:

1. A method, comprising:

transiting a first Digital Subscriber Loop transceiver from a Digital Subscriber Loop communication session to a Digital Subscriber Loop wait state in which the first Digital Subscriber Loop transceiver transmits substantially lower power to a local-end line, the transiting being perfromed in response to an interruption or a substantial stop in the Digital Subscriber Loop communication session of Digital Subscriber Loop communications in one direction between the first Digital Subscriber Loop transceiver and a second Digital Subscriber Loop transceiver;

transmitting a first Digital Subscriber Loop acknowledge signal from the first Digital Subscriber Loop transceiver to the local-end line in response to receiving a Digital Subscriber Loop wait signal at the first Digital Subscriber Loop transceiver from the local-end line; and in response to the transmitting, resuming to transmit Digital Subscriber Loop communications from the first Digital Subscriber Loop transceiver to the local-end line at a power substantially higher than a power transmitted to the local-end line in the Digital Subscriber Loop wait state, the act of resuming being responsive either to receiving at the first Digital Subscriber Loop transceiver a substantially higher Digital Subscriber Loop power than a Digital Subscriber Loop power received thereat in the Digital Subscriber Loop wait state or to receiving at the first Digital Subscriber Loop transceiver a second Digital Subscriber Loop acknowledge signal from the second Digital Subscriber Loop transceiver.

2. The method of claim 1, wherein the act of transiting includes transmitting a Digital Subscriber Loop wait signal from the first Digital Subscriber Loop transceiver to the local-end line.

3. The method of claim 1, wherein the method comprises receiving a Digital Subscriber Loop acknowledge single from the second Digital Subscriber Loop transceiver at the first Digital Subscriber Loop transceiver.

4. The method of claim 1, wherein the interruption or substantial stop includes receiving from the local-end line at the first transceiver a time-averaged Digital Subscriber Loop power that is reduced by 6 dB or more relative to a time-averaged Digital Subscriber Loop power received from the local-end line at the first transceiver during an active state immediately prior to the interruption or substantial stop.

5. The method of claim 1, wherein the time-averaged Digital Subscriber Loop power transmitted by the first transceiver to the local-end line between the act of transiting and the act of resuming is reduced by 6 dB or more with respect to a time-averaged Digital Subscriber Loop power transmitted to the local-end line by the first transceiver during a Digital Subscriber Loop active state just prior to the Digital Subscriber Loop wait state.

6. The method of claim 1, wherein the act of resuming to transmit Digital Subscriber Loop communications includes precoding data transmissions of a set of centrally controlled Digital Subscriber Loop transceivers including the first Digital Subscriber Loop transceiver, the precoding using a precoding matrix used to precode Digital Subscriber Loop data signals for transmission by the set just prior to the time of the interruption or substantial stop.

7. The method of claim 1, wherein the first Digital Subscriber Loop transceiver transmits Digital Subscriber Loop power to the local-end line between the act of transiting and the act of resuming over less than a third of a set of Digital Subscriber Loop tones used by the first Digital Subscriber Loop transceiver to transmit Digital Subscriber Loop communications thereto during a Digital Subscriber Loop active state just prior to the Digital Subscriber Loop wait state.

8. The method of claim 1, wherein the act of resuming includes decoding Digital Subscriber Loop data communications received by a set of centrally controlled Digital Subscriber Loop transceivers including the first Digital Subscriber Loop transceiver, the decoding using a decoding matrix used to decode Digital Subscriber Loop data signals received by the set just prior to a time of the interruption or substantial stop.

9. A method, comprising:

transiting a first Digital Subscriber Loop transceiver to a Digital Subscriber Loop wait state in which the first Digital Subscriber Loop transceiver transmits a substantially lower power to a local-end line, the transiting being in response to an interruption or a substantial stop of Digital Subscriber Loop communications in one direction between the first Digital Subscriber Loop transceiver and a second Digital Subscriber Loop transceiver, the first Digital Subscriber Loop transceiver transmitting a Digital Subscriber Loop wait signal to the local-end line in the Digital Subscriber Loop wait state; and resuming to transmit Digital Subscriber Loop communications from the first Digital Subscriber Loop transceiver to the local-end line at a power substantially higher than a power transmitted from the first Digital Subscriber Loop transceiver to the local-end line in the Digital Subscriber Loop wait state or transmitting a second Digital Subscriber Loop acknowledge signal from the first Digital Subscriber Loop transceiver to the local-end line; and wherein the act of resuming to transmit Digital Subscriber Loop communications or transmitting a second Digital Subscriber Loop acknowledge signal is responsive to receiving at the first Digital Subscriber Loop transceiver a first Digital Subscriber Loop acknowledge signal from the local-end line in response to the Digital Subscriber Loop wait signal.

10. The method of claim 9, wherein in response to the receiving at the first Digital Subscriber Loop transceiver a first Digital Subscriber Loop acknowledge signal from the local-end line, the first Digital Subscriber Loop transceiver transmits a second Digital Subscriber Loop acknowledge signal to the local-end line.

11. The method of claim 9, wherein the transiting includes reducing a time-averaged Digital Subscriber Loop power transmitted from the first Digital Subscriber Loop transceiver to the local-end line by 6 dB or more relative to a time-averaged Digital Subscriber Loop power transmitted thereto by the first Digital Subscriber Loop transceiver during the Digital Subscriber Loop communication session in which Digital Subscriber Loop communications were interrupted or substantially stopped.

12. The method of claim 9, wherein the first Digital Subscriber Loop transceiver transmits the Digital Subscriber Loop wait signal to the local-end line over less than a third of Digital Subscriber Loop tones used by the first Digital Subscriber Loop transceiver to transmit Digital Subscriber Loop data communications during the Digital Subscriber Loop communication session in which Digital Subscriber Loop communications were interrupted or substantially stopped.

13. An apparatus, comprising:
a Digital Subscriber Loop transceiver configured to perform acts of:
transiting to a Digital Subscriber Loop wait state in which a power transmitted from the Digital Subscriber Loop transceiver to a local-end line is substantially reduced, the transiting being in response to an interruption or substantial stop at the Digital Subscriber Loop transceiver of reception of Digital Subscriber Loop communications from the local-end line;
transmitting to the local-end line a Digital Subscriber Loop acknowledge signal in response to receiving from the local-end line a Digital Subscriber Loop wait signal; and
resuming to transmit Digital Subscriber Loop communications to the local-end line at a power substantially higher than the power transmitted thereto in the Digital Subscriber Loop wait state in response either to receiving from the local-end line Digital Subscriber Loop transmissions at a substantially higher power than received there from in the Digital Subscriber Loop wait state or to receiving from the local-end line a second Digital Subscriber Loop acknowledge signal.

14. The apparatus of claim 13, wherein the apparatus comprises a set of centrally controlled Digital Subscriber Loop transceivers including the first Digital Subscriber Loop transceiver; and
wherein the set of the centrally controlled Digital Subscriber Loop transceivers is configured to precode parallel Digital Subscriber Loop data transmissions with a matrix when the first Digital Subscriber Loop transceiver performs the act of resuming, the matrix being used to precode parallel data transmissions near and prior to the interruption or substantial stop.

15. The apparatus of claim 13, wherein the apparatus comprises a set of centrally controlled Digital Subscriber Loop transceivers including the first Digital Subscriber Loop transceiver; and
wherein the set of the centrally controlled Digital Subscriber Loop transceivers is configured to decode parallel received Digital Subscriber Loop data communications with a matrix when the first Digital Subscriber Loop transceiver performs the act of resuming, the matrix being used to decode received Digital Subscriber Loop data communications near and prior to the interruption or substantial stop.

16. The apparatus of claim 13, wherein the Digital Subscriber Loop transceiver is configured to transmit to the local-end line a Digital Subscriber Loop wait signal during the Digital Subscriber Loop wait state.

17. An apparatus, comprising:
a Digital Subscriber Loop transceiver configured to:
transit to a Digital Subscriber Loop wait state in which a power transmitted from the Digital Subscriber Loop transceiver to a local-end line is substantially reduced in response to an interruption or substantial stop at the Digital Subscriber Loop transceiver of reception of Digital Subscriber Loop communications from the local-end line, the Digital Subscriber Loop transceiver being configured to transmit to the local-end line a Digital Subscriber Loop wait signal in the Digital Subscriber Loop wait state, and
resume to transmit Digital Subscriber Loop communications to the local-end line at a power substantially higher than a power transmitted by the Digital Subscriber Loop transceiver thereto in the Digital Subscriber Loop wait state in response to receiving a Digital Subscriber Loop acknowledge signal from the local-end line in response to transmitting the wait signal thereto.

18. The apparatus of claim 17, wherein the Digital Subscriber Loop transceiver is configured to transit by reducing a time-averaged Digital Subscriber Loop power transmitted there from to the local-end line by 6 dB or more relative to a time-averaged Digital Subscriber Loop power transmitted thereto by the Digital Subscriber Loop transceiver during the resuming to transmit Digital Subscriber Loop communications from the Digital Subscriber Loop transceiver to the local-end line.

19. The apparatus of claim 17, wherein the Digital Subscriber Loop transceiver is configured to transmit the Digital Subscriber Loop wait signal to the local-end line over less than a third of a set of Digital Subscriber Loop tones used by the Digital Subscriber Loop during the resuming to transmit Digital Subscriber Loop communications from the Digital Subscriber Loop transceiver to the local-end line.

20. The apparatus of claim 17, further comprising a set of centrally controlled Digital Subscriber Loop transceivers including the Digital Subscriber Loop transceiver configured to perform the act of resuming; and
wherein, when the Digital Subscriber Loop transceiver performs the act of resuming, the set of the centrally controlled Digital Subscriber Loop transceivers is configured to precode parallel Digital Subscriber Loop data transmissions with a precoding matrix used to precode parallel Digital Subscriber Loop data transmissions just prior to the interruption or substantial stop and/or to decode parallel received Digital Subscriber Loop data communications with a decoding matrix used to decode received parallel Digital Subscriber Loop data communications just prior to the interruption or substantial stop.

\* \* \* \* \*